June 25, 1957  E. K. BONNER, JR  2,796,719
REEL TYPE MOWER HITCH
Filed April 23, 1956

INVENTOR
EDWIN K. BONNER JR.
BY
ATTORNEY

United States Patent Office 2,796,719
Patented June 25, 1957

2,796,719

REEL TYPE MOWER HITCH

Edwin K. Bonner, Jr., Philadelphia, Pa., assignor to S. L. Allen & Co., Inc., Philadelphia, Pa., a corporation of Pennsylvania Application April 23, 1956, Serial No. 580,063

4 Claims. (Cl. 56—249)

This invention relates to a hitch for lawn mowers of the so-called "reel" type in which the cutting is done by a plurality of helically formed blades rotating about their common horizontal axis in cutting relation with a relatively fixed rectilinear stationary blade.

Mowers of this type provided with means for pushing them manually over a lawn have been in use for many years but efforts to adapt them to power appliances such as farm or garden tractors have not been entirely successful. For such adaptation it has generally been the practice to attach draft mechanism to the tie bar extending horizontally across the mower unit above and forwardly of the axis of its ground engaging and reel driving wheels and connect this mechanism with the draw bar of the tractor. When used on smooth lawns such arrangements are reasonably satisfactory, but when used on rough or irregular terrain the rear reel-carrying part of the mower tends to oscillate vertically with the result that the grass of the lawn is cut unevenly as to length.

It is therefore an object of this invention to provide means for attaching a reel type lawn mower unit to the draw bar of a tractor or the like, whereby substantial uniformity of performance by the mower is attained even when the terrain over which it is drawn is relatively rough and uneven in contour.

Other objects, purposes and advantages of the invention will hereinafter appear or will be understood from the following description of a preferred embodiment of it illustrated in the accompanying drawing, in which.

Figure 1:
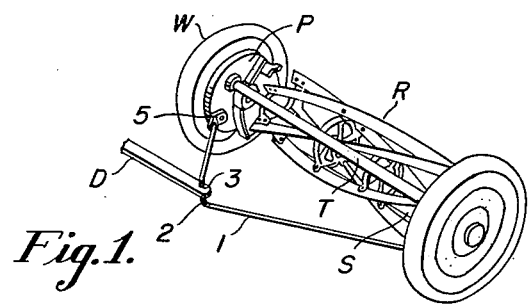
Fig. 1 is a perspective view of a typical reel type lawn mower unit attached to a fragmentarily indicated tractor draw bar through the medium of attaching means embodying the invention, hereinafter generally designated the hitch.

Referring now more particularly to the drawing, the lawn mower unit illustrated may be considered as representative of substantially any lawn mower of its type, comprising in general opposed complementary end plates forming housings for the reel driving gears and supports for the reel end bearings as well as the wheel bearings. In Fig. 1 but one of these plates designated P appears, the other being hidden by one of the wheels W which support the unit and, being rotated by its forward motion along the ground, drive the reel R through the gears to which reference has been made, its axial shaft rotating in end bearings B in the plates, while the wheels rotate about a common axis on stub axles A each secured to one of the plates P by a nut N. A tie rod T and a stationary blade support carrying the stationary blade S of usual type cooperative with the reel blades hold the castings in assembled relation, the rod T being the part to which, as above noted, hitches have heretofore been secured for connecting mowers of this type to a tractor draw bar such as the draw bar D in Fig. 1 which may be considered as typical of elements useful for this purpose.

In accordance with my invention the hitch for connecting the mower unit to the draw bar comprises a draft bail 1 extending vertically at its mid point 2 through a hole 3 in the draw bar D; thence its arms diverge outwardly and downwardly toward the unit. The extremities of these arms pass through similar brackets attached to the mower unit plates and it will be understood that the following description of one of them applies equally but oppositely to the other. Thus, the bracket 5 secured by a bolt 6, nut 7 and washer 8 to plate P extends angularly forwardly and upwardly from its point of attachment to the plate and is provided with a hole 9 for reception of the extremity of one bail arm which is bent to freely engage in this hole when the parts are assembled. The center of hole 9 is preferably aligned with the centers of the hole in the bracket through which bolt 6 extends and a hole 10 in plate P at which the stationary blade mount is secured.

Figure 2:
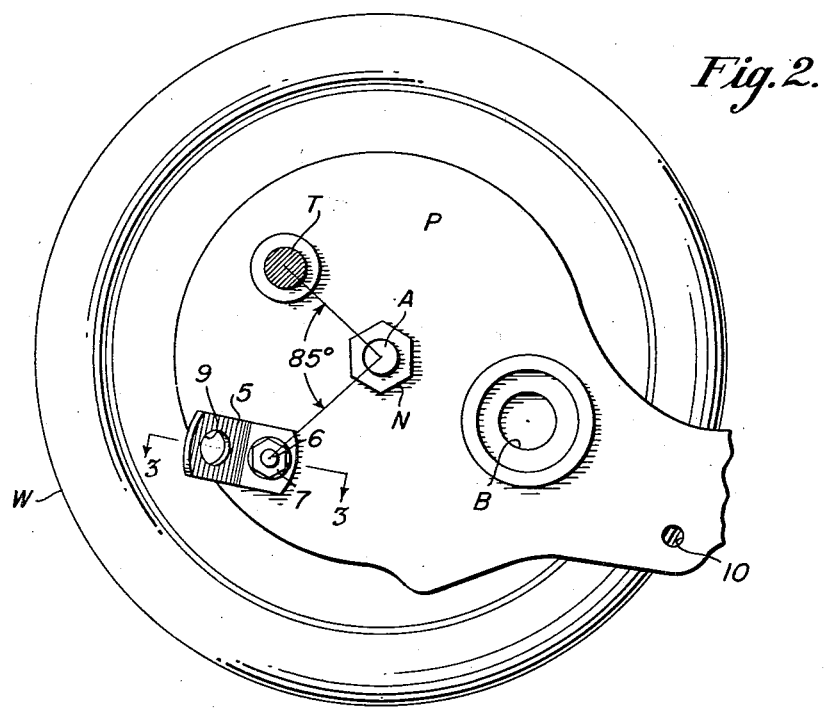
Fig. 2 is an enlarged fragmentary detail principally in side elevation showing a portion of the mower unit and one of the attaching brackets of the hitch.
Figure 3:
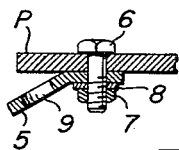
Fig. 3 is a fragmentary section on the line 3—3 in Fig. 2.

Desirably the point at which bracket 5 is attached to plate P, as best illustrated in Fig. 2, is on a line forming with the line extending from the axis of the wheel supporting stub axle A to the center of rod T an angle of 85° bisected by the horizontal plane of the wheel axis, the center of the hole for bolt 6 being preferably slightly more remote from the wheel axis than the center of tie rod T. To maintain adequate traction to insure turning of the wheels and hence of the reel as the mower unit is drawn over the ground and to negative undesirable vertical oscillation of the mower unit when operated on rough terrain, the said hole should be located appreciably below said horizontal plane yet not below a plane parallel thereto midway between it and the ground level. I regard this as critical since it has been found that if the center of attachment of the bracket is below the lower of these two planes the wheels are prone to slip and the reel drive is then inadequate, while if it is above the upper one the mower tends to oscillate vertically as when a hitch is connected to tie rod T. Preferably the draft bail extends from holes 9 in the brackets substantially in prolongation of the line from hole 10 through the center of the hole for bolt 6.

It will be appreciated that my hitch may be provided for mower units in the course of manufacture and assembly or may readily be incorporated in existing units by simply properly locating and drilling suitable holes in the mower plates and attaching the hitch brackets thereto with the draft bail in assembled relation therewith. It is of course immaterial whether the draft bar to which the bail is secured be connected thereto by passing it through a hole in the bar or otherwise connecting it therewith, although whatever be the specific type of connection between the bail and the draft bar it is desirable that it afford some capacity for limited oscillation of the former with respect to the latter. Equally, the draft bar may extend from the tractor unit either forwardly or toward the rear with reference to its normal direction of travel, while any desired number of mower units may be connected to a single tractor, each being provided with its own hitch. Moreover, it will be apparent that turns, reversals and other maneuvers by the tractor operator may be carried out with normal facility when my hitch is employed and the mower unit may easily be disconnected from the tractor to release the latter for other duty merely by loosening one or both of bolts 6 sufficiently to enable the draft bail to be disengaged from holes 9 in brackets 5 or, if other means be used for securing the draft bail to the tractor draw bar, by merely releasing such means, leaving the draft bail assembled with the mower unit.

While I have herein described one embodiment of the invention with considerable particularity it will be understood that within the critical limits herein specifically stated changes and modfication in the form, structure, arrangement and relationship of the parts will readily occur to those skilled in the art and may be utilized if desired without departing from the spirit and scope of the invention as defined in the appended claims.

Having thus described my invention, I claim and desire to protect by Letters Patent of the United States:

1. A tractor hitch for a reel type mower unit comprising a draft bail having forwardly converging arms, brackets secured to the mower unit and having pivotal engagement respectively with the outer extremities of said arms, said brackets being attached to the mower unit at points in a common plane forwardly of the axis of the ground engaging wheels of the unit and between the horizontal plane of said axis and the plane midway between said horizontal plane and the ground level.

2. Apparatus as defined in claim 1 in which the draft bail arms are integral and converge toward an intermediate section extending in a plane substantially normal to the general plane of the arms.

3. Apparatus as defined in claim 1 in which the brackets extend forwardly inwardly and upwardly from their points of securement to the unit in substantial prolongation of lines drawn to said points from points of securement of a stationary cutting blade within the unit.

4. In combination with a reel type lawn mower including a pair of ground wheels, side plates associated therewith, a stationary transversely extending blade supported therefrom rearwardly of the axis of the wheels at spaced points equidistant from said axis and a rotatable blade reel cooperative with said blade to shear the grass, a draft bail having forwardly converging arms for connection at their apex to the draw bar of a tractor and a bracket secured to each plate at a point forwardly of the wheel axis and receiving the free end of one of the bail arms for vertical oscillation relatively to the brackets about an axis paralleling the wheel axis and lying in a plane extending through the points of support of the stationary blade and thence forwardly upward between the wheel axis and a point midway between said wheel axis and the ground.

References Cited in the file of this patent
UNITED STATES PATENTS 2,100,910     Moyer _____ Nov. 30, 1937